United States Patent [19]

Rossing et al.

[11] Patent Number: 4,598,028

[45] Date of Patent: Jul. 1, 1986

[54] HIGH STRENGTH POROUS SUPPORT TUBES FOR HIGH TEMPERATURE SOLID ELECTROLYTE ELECTROCHEMICAL CELLS

[75] Inventors: Barry R. Rossing, Churchill; Gregory E. Zymboly, Penn Hills, both of Pa.

[73] Assignee: Westinghouse Electric Corp., Pittsburgh, Pa.

[21] Appl. No.: 701,263

[22] Filed: Feb. 13, 1985

[51] Int. Cl.$^4$ ............................................. H01M 8/12
[52] U.S. Cl. ................................. 429/30; 429/31; 429/33; 429/44
[58] Field of Search ................... 429/30, 31, 32, 33, 429/44, 45, 191, 235

[56] References Cited

U.S. PATENT DOCUMENTS

| | | | |
|---|---|---|---|
| 3,441,390 | 4/1969 | Backe et al. | 429/45 |
| 3,460,991 | 8/1969 | White, Jr. | 429/30 |
| 3,703,413 | 11/1972 | Arrance | 429/235 |
| 4,395,468 | 7/1983 | Isenberg | 429/31 |
| 4,431,715 | 2/1984 | Isenberg | 429/30 |
| 4,462,891 | 7/1984 | Lawless | 429/30 X |
| 4,490,444 | 12/1984 | Isenberg | 429/31 |
| 4,520,082 | 5/1985 | Makiel | 429/31 X |

Primary Examiner—Anthony Skapars
Attorney, Agent, or Firm—Daniel P. Cillo

[57] ABSTRACT

A high temperature, solid electrolyte electrochemical cell is made, having an electrode and a solid electrolyte disposed on a porous, sintered support material containing thermally stabilized zirconia powder particles and from about 3 wt. % to about 45 wt. % of thermally stable oxide fibers.

12 Claims, 3 Drawing Figures

HIGH STRENGTH POROUS SUPPORT TUBES FOR HIGH TEMPERATURE SOLID ELECTROLYTE ELECTROCHEMICAL CELLS

GOVERNMENT CONTRACT

The Government of the United States of America has rights in this invention pursuant to Contract No. DE-AC-0280-ET-17089, awarded by the U.S. Department of Energy.

BACKGROUND OF THE INVENTION

High temperature fuel cell generators employing interconnected, tubular fuel cells, with solid electrolytes, are taught by A. O. Isenberg, in U.S. Pat. No. 4,395,468. Support tube, fuel electrode, air electrode, solid electrolyte and interconnection configurations for individual fuel cells, are taught by A. O. Isenberg, in U.S. Ser. No. 323,641, filed on Nov. 20, 1981. Usually, a porous support tube of sintered, calcia stabilized zerconia powder, approximately 1 millimeter to 2 millimeters thick, having a 12 millimeter to 13 millimeter outside diameter, has an air electrode deposited on it. The air electrode is about 50 microns to 500 microns thick (0.05 millimeter to 0.5 millimeter) and may be made of, for example, $LaMnO_3$, $CaMnO_3$, $LaNiO_3$, $LaCoO_3$, $LaCrO_3$, etc. Surrounding the outer periphery of the air electrode is a layer of gas-tight solid electrolyte, usually yttria stabilized zirconia, approximately 1 micron to 100 microns (0.001 millimeter to 0.1 millimeter) thick. A selected radial segment of the air electrode is covered by an interconnect material. The interconnect material may be made of a lanthanum chromite film, of approximately 50 microns (0.5 millimeter) thickness. Substantially surrounding the solid electrolyte is a porous fuel electrode, generally a nickel zirconia cermet anode, having a thickness of about 50 microns (0.05 millimeter). Thus, the support is usually from 4 to 20 times thicker than the other components of the cell.

The usual support tube consists of 15 mole percent calcia stabilized zirconia powder particles extruded into tubes, dried, and sintered at about 1650° C. for 4 hours. Cellulose is used as a pore former and is burned off during sintering. The powder particles used are of general spherical form and are usually 4 microns to 20 microns average particle size. The primary function of the support tube used in high temperature solid oxide electrolyte fuel cells is to support the other fuel cell elements while allowing for adequate flow of gases, especially oxygen, through its structure. In order to pass oxygen through its structure a high level of porosity must be incorporated into the support tube during processing. It is well known that the strength of ceramics is proportional to $e^{-bP}$, where b is an empirical constant in the range of 4 to 7 and P is the pore fraction. Therefore, as the porosity is increased strength decreases exponentially.

In order to optimize the performance of the support tube, a trade-off between mechanical strength and gas diffusion coefficients must be struck by varying tube porosity. Experience has shown that satisfactory cell operation and life can be realized using support tubes which have 30% porosity, 6750 psi strength and room temperature oxygen-diffusion coefficients of 0.010 $cm^2/sec$ to 0.012 $cm^2/sec$. While these values are satisfactory, higher strengths and/or diffusion coefficients are desired. It would also be especially beneficial if lightweight, high strength support tubes could be developed, since they would allow a thinner support thickness, reducing the oxygen path to the air electrode, and reducing the size and weight of the fuel cell.

SUMMARY OF THE INVENTION

The above problems have been solved and the above needs met by providing a porous, sintered support material containing from about 3 wt. % to about 45 wt. % of thermally stable oxide fibers which are not substantially reactive with the support oxide powder, such as thermally stabilized zirconia powder particles. These fibers should have lengths of from about 800 microns to about 2400 microns and diameters of from about 0.5 micron to about 20 microns, and have an approximate match of thermal expansion properties with the zirconia powder matrix. Useful oxide fibers include yttria stabilized zirconia fibers and calcia stabilized zirconia fibers. It has been found that the introduction of these fibers opens up the tube structure, producing lower green and fired densities as well as much higher gas diffusion coefficients. Even with a decrease in the tube density, tube strength increases due to the interlocking, reinforcing action of the fibers. The addition of 15 wt. % of these fibers can increase tube strength by over 30%, while also increasing gas transport by 50%. These fiber containing supports can be used in flat or tubular form and can be used in a variety of other electrochemical cells such as oxygen sensors or combustion sensors, or as supports in a multiplicity of high temperature operations where high strength and high porosity are required.

BRIEF DESCRIPTION OF THE DRAWINGS

For a better understanding of the invention, reference may be made to an embodiment exemplary of the invention, shown in the accompanying drawings, in which.

DESCRIPTION OF THE PREFERRED EMBODIMENTS

As shown in U.S. Pat. No. 4,395,568, herein incorporated by reference, a fuel cell arrangement or stack can comprise a plurality of elongated annular fuel cells. Each fuel cell is preferably tubular and is electrically connected at least in series to an adjacent cell. The electrical connection is made along a selected axial length of the cells, preferably the entire electrochemically active length. Each cell generates an open circuit voltage of approximately one volt, and multiple cells can be connected in series in order to provide a desired system voltage.

Figure 1:
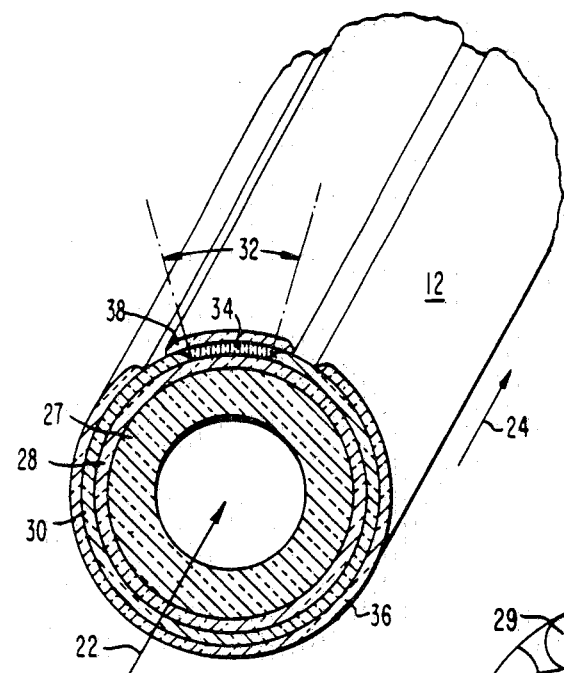
FIG. 1 is an isometric section view of a singular tubular type fuel cell showing one embodiment of the tube of this invention supporting the other fuel cell components.

FIG. 1 of the Drawings shows the preferred configuration for the fuel cells of this invention. The preferred configuration is based upon a system wherein a gaseous fuel, such as hydrogen or carbon monoxide, is directed axially over the outside of the cell 12, as indicated by the arrow 24, and an oxidant, such as air, or $O_2$ indicated by the arrow 22, flows through the inside of the cell. It will be recognized that the location of the reactant fuel and oxidant can be interchanged such that air, or $O_2$, flow about the cells and fuel flows within the cells. This requires the reversal of the cell electrodes. Where the cell is as shown, oxygen molecules pass through the support and air electrode and are changed to oxygen ions which pass through the electrolyte to combine with fuel at the fuel electrode. It should be noted that the following description of the prepared tubular configuration should not be considered limiting. The term "air electrode" as used throughout means that electrode which will be in contact with oxidant, and "fuel electrode" means that electrode that will be in contact with fuel.

Figure 2:
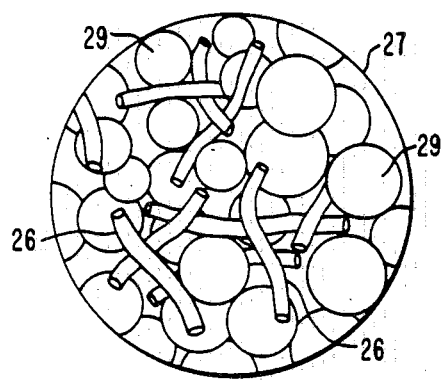
FIG. 2 is a cross-section of the support shown in FIG. 1, showing the combination of fibers and spherical particles.

In preferred form, each cell 12 includes a porous, sintered support tube 27 which provides structural integrity to the cell. The supporting material for the electrolyte and other cell components is comprised of stabilized oxide powder, such as thermally stabilized zirconia powder particles, strengthened with oxide fibers. The materials can form a porous wall approximately 0.5 millimeter to 2 millimeters thick, preferably 0.5 millimeter to 1 millimeter thick. One of the principal advantages of incorporating fibers into the support is that their interlocking, reinforcing action allows the use of thinner supports than heretofore possible, reducing the oxygen path into the cell, and reducing the size and weight of the fuel cell. Not only are thinner supports as strong as the previous thicker supports, but the fibers allow a dramatic increase in gas transport. FIG. 2 shows a cross-section of support 27 where fibers 26 are shown in interlocking contact with spherical zirconia particles 29 in a porous zirconia particle matrix. The entire mass is sintered together with the fibers providing a strengthening network.

The preferred thermally stabilized zirconia is a calcia stabilized zirconia containing from 5 mole percent to 20 mole percent calcia, and in its most preferred form has the chemical formula $(ZrO_2)_{.85}(CaO)_{.15}$. The calcia or the like stabilizer prevents phase transformations during temperature cycling. The calcia stabilized zirconia powder particles used are generally spherical in shape, shown as 29 in FIG. 2, and have a particle size range of from about 1 micron to about 100 microns, preferably from about 4 microns to about 20 microns. The term "powder particles" as used herein is meant to include spherical particles, rather than longitudinal particles having a long length to diameter ratio.

Useful fibers for the support are thermally stable oxide fibers. The term "thermally stable" is meant to include fibers which do not react in any substantial fashion in the temperature range of from about 25° C. to about 1700° C. with the thermally stabilized zirconia powder to produce structurally weakened materials or a glass phase. The fibers themselves or any composition formed during sintering must not have a coefficient of thermal expansion substantially different from that of the calcia stabilized zirconia powder particles, i.e., about $10 \times 10^{-6}$ M/M° C. over the range of from 25° C. to 1000° C. Values of 20% above and below this value are acceptable, and are defined as "approximating" the thermally stabilized zirconia particle expansion coefficient.

Useful thermally stable oxide fibers include: yttria stabilized zirconia fibers such as $(ZrO_2)_{1-x}(Y_2O_3)_{x=0.05 \text{ to } 0.2}$; calcia stabilized zirconia fibers, the same composition as the spherical particles, i.e., $(ZrO_2)_{1-x}(CaO)_{x=0.05 \text{ to } 0.2}$; alumina fibers, i.e., $Al_2O_3$; aluminia-silica fibers such as mullite fibers, i.e., $3Al_2O_3 \cdot 2SiO_2$, and the like, and mixtures thereof, with the first two being preferred. The fibers must be sinterable to each other and to the calcia stabilized zirconia particles at sintering temperatures of up to 1700° C. and must not melt or form a structurally weak phase.

The support fibers should have lengths of from about 1/32 inch, i.e., 800 microns to about 3/32 inch, i.e., 2400 microns and diameters of from about 0.5 micron to about 20 microns. Lengths and diameters below 800 microns and 0.5 micron respectively will not provide a high strength interconnecting network within and with the calcia stabilized zirconia particles. The useful weight percent range of fibers is from about 3 wt. % to about 45 wt. % based on fiber plus calcia stabilized zirconia particle weight. Under about 3 wt. % fiber addition, strength and porosity improvements are minimal. Over about 45 wt. % and the support structure may become too porous or weak, and use of such a large amount of the costly fibers would be expensive. The preferred weight percent range of fibers is from about 5 wt. % to about 20 wt. % providing a porosity of approximately 30% to 35%.

In the method of making the preferred support of this invention, calcia stabilized zirconia particles and high temperature stable oxide fibers are mixed in an appropriate ratio. Into this admixture an organic binder system and pore former are blended. Useful organic binders include starch, polyvinyl alcohol, methyl cellulose, wax emulsions, and the like. The binder is added in the range of from about 2 wt. % to about 10 wt. %, to provide good green strength during the initial sintering operation. The binder is vaporized at final sintering temperatures. Useful pore formers include pure cellulose, sawdust, carbon powder, and other sacrificial fillers. The pore former is added in the range of from about 1 wt. % to about 10 wt. %, to help provide an even more porous structure in the final product. The pore former is vaporized at final sintering temperatures.

After blending of the ingredients, the admixture is kneaded through a double arm blender, and then extruded in a regular pressure extruder or cast using a slip cast method extruder, into a suitable, usually cylindrical form about 30 centimeters to 92 centimeters long and, from about 0.5 millimeter to about 2 millimeters thick, having an outside diameter of from about 5 millimeters to about 25 millimeters. After extrusion, the support is dried in a controlled humidity oven at a temperature of about 100° C. for about 8 hours, followed by sintering in air in a kiln, at from 1400° C. to 1700° C. for from 2 hours to 5 hours, to provide a 30% to 35% porous, unitary, strong sinter bonded, fiber-particle structure. The deformation of the fibers and particles is minimal, so that a separate fiber-particle structure is maintained in the final support. The support is then slowly cooled to room temperature.

Referring again to FIG. 1, surrounding the outer periphery of the support 27, there can be a thin film porous air electrode, or cathode 28. The exemplary system cathode 28 is a composite oxide structure approximately 50 microns to 1000 microns (0.05 millimeter to 1 millimeter) thick, which can be deposited onto the support tube through well-known techniques. The air cathode can be, for example, comprised of doped and undoped oxides or mixtures of oxides, such as $LaMnO_3$, $CaMnO_3$, $LaNiO_3$, $LaCoO_3$, $LaCrO_3$, doped indium oxide, $In_2O_3$, various noble metals, and other electronically conducting mixed oxides generally composed of rare earth oxides mixed with oxides of cobalt, nickel, copper, iron, chromium and manganese, and combinations of such oxides. Preferred dopants are strontium, calcium, cobalt, nickel, iron, and tin.

Generally surrounding the outer periphery of the air electrode 28 is a layer of gas-tight solid electrolytye 30, generally comprised of yttria stabilized zirconia about 1 micron to about 100 microns thick, for the exemplary cell. The electrolyte 30 can be deposited onto the air electrode by well-known high temperature vapor deposition techniques. However, a selected radial segment 32 of the air electrode 28 is, for example, masked during electrolyte deposition, and a layer of an interconnect material 34 is deposited on this segment 32.

The interconnect material 34, which preferably extends the active length of each elongated cell 12, must be electrically conductive in both an oxidant and fuel environment. Accordingly, the exemplary cell includes a gas-tight interconnection 34 approximately the same thickness as the electrolyte, about 5 microns to about 100 microns. The preferred interconnection material is a lanthanum chromite material.

Substantially surrounding the solid electrolyte 30 is a second porous electrode, for example, a nickel-zirconia or cobalt zirconia cermet fuel electrode, an anode 36. As shown, the anode 36 is also discontinuous, being spaced from the interconnection 34 a distance sufficient to avoid direct electrical communcation between the anode 36 and both the interconnection 34 and the cathode 27. The exemplary anode 36 is about 100 microns thick.

Deposited over the interconnection 34 is a layer 38 which is preferably comprised of the same material as the fuel anode 36, nickel or cobalt zirconia cermet, and of the same thickness, about 100 microns.

Figure 3:
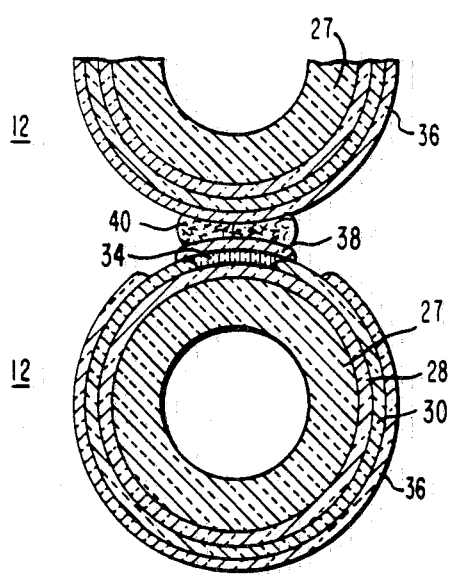
FIG. 3 is a section view through two adjacent fuel cells.

FIG. 3 shows the series interconnection between consecutive fuel cells 12. The electrical interconnection is preferably enhanced by a metal felt 40. The felt extends axially between the annular cells 12, and is bonded to each by pressure contact which causes sinter bonding during operation. In the inverted cell structure, where fuel flows inside of the cells, the felt material is made from conducting oxide fibers.

During operation of the preferred cell, air, or $O_2$, flows through the center of the annular cells 12, and fuel passes over the exterior. Oxygen molecules diffuse through the porous support 27 and cathode 28. Fuel diffuses through the anode 36. Oxygen ions pass through the electrolyte 30. These reactants electrochemically interact via the actions of the electrolyte and elctrodes in generating products such as water vapor and carbon dioxide, as well as heat and electrical energy. The high temperature water vapor and carbon dioxide are carried away from the cell with, for example, unburned fuel, and electrical power is transferred in series from the inner cathode 28 of one cell to the outer anode 36 of the next cell. The electrical power is usefully drawn through leads not shown.

To make the preferred fuel cell of this invention, a porous, sintered support tube is made, containing, for example, 85 wt. % calcia stabilized zirconia particles and 15 wt. % yttria stabilized zirconia fibers, and having, for example, a 1 millimeter wall and a 12.5 millimeter outside diameter. This support is covered with 1 millimeter thickness of air electrode material, for example, a doped lanthanum manganite. The air electrode is then masked over the radial segment where the interconnect is to be deposited later. The electrolyte is then applied by vapor deposition at about 1200° C. After demasking the radial segment, the interconnect material is applied over the air electrode layer by vapor deposition. Finally the fuel electrode is applied over the electrolyte.

EXAMPLE 1

Four extruded, sintered support tubes were made from four sample batches containing: $(ZrO_2)_{.85}(CaO)_{.15}$ powder particles having a substantially spherical cross-section and an average particle size of about 8.5 microns; about 3 wt. % of cellulose powder as a pore former; about 3.5 wt. % of starch as a binder; and various amounts of $(ZrO_2)_{.9}(Y_2O_3)_{.1}$ fibers having fiber diameters of from about 1 micron to 15 microns and fiber lengths of about 1/32 inch to 1/16 inch. The ingredients were blended for about 30 minutes in a V cone blender, and then kneaded for about 30 minutes in a double arm blender, to insure uniform distribution of the ingredients. A tube 46 centimeters long and 1.5 millimeters thick, having an outside diameter of 12.5 millimeters, was extruded at 25° C., using a standard pressure-type extruder. The tube had good green strength, was dried in an oven at 100° C. for 8 hours and then fired at 1650° C. for 4 hours, to sinter the tube and vaporize the pore former and binder. The wt. % of fibers in the finished, sintered tube, as well as the porosity, various densities, strength, and oxygen gas diffusion values are given below in Table 1.

TABLE 1

| Sample | Wt. % Yttria Stabilized Zirconia Fibers | Wt. % Calcia Stabilized Zirconia Powder Particles | Porosity | Green Density (g/cc) | Fired Density (g/cc) | Strength (psi) | O2 Gas Diffusion Coefficient (cm2/sec) |
|---|---|---|---|---|---|---|---|
| 1* | 0% | 100% | 30% | 2.88 | 3.74 | 6760 | 0.0119 |
| 2 | 5% | 95% | 31% | 2.75 | 3.60 | 7950 | 0.0139 |
| 3 | 10% | 90% | 31% | 2.70 | 3.62 | 8360 | 0.0156 |
| 4 | 15% | 85% | 32% | 2.62 | 3.61 | 9150 | 0.0164 |

*Control sample

As can be seen, a dramatic increase in stength occurs evan at the Sample 2 loading of 5% fiber, with a substantial increase in $O_2$ gas diffusion coefficient, the higher the diffusion coefficient value the better. Samples 3 and 4 show even more improvement. Tube samples 3 and 4 were subsequently used as tubular supports for a doped lanthanum manganite air electrode and a nickel cermet fuel electrode having a yttrium stabilized zirconia solid electrolyte therebetween, to provide a tubular fuel cell.

We claim:

1. A high temperature electrochemical cell comprising an electrode, a separate solid oxide electrolyte and a separate porous, sintered material supporting said electrolyte and electrode, said porous, sintered material comprising a mixture of thermally stable oxide powder particles and thermally stable oxide fibers, where the oxide powder particles and the oxide fibers are sintered together in interlocking contact, said fibers being thermally stable up to about 1700° C., and comprising from about 3 wt. % to about 45 wt. % of the sintered material.

2. The electrochemical cell of claim 1, where the coefficient of thermal expansion of the fibers approximates that of the oxide powder particles in the porous sintered material.

3. In a high temperature, solid electrolyte electrochemical cell having two electrodes with a separate solid electrolyte therebetween, where one of the electrodes is disposed on a separate porous, sintered, support material comprising zirconia powder particles, the improvement comprising inclusion in the sintered support material of from about 3 wt. % to about 45 wt. % of thermally stable oxide fibers, where the coefficient of thermal expansion of the oxide fibers approximates that of the zirconia powder particles, and the zirconia powder particles and the oxide fibers are sintered together in interlocking contact, said fibers being thermally stable up to about 1700° C.

4. The electrochemical cell of claim 3, where the oxide fiber material in the support is not substantially reactive with the zirconia particle material at sintering temperatures of the support, and where the fibers in the support have lengths of from about 800 microns to about 2400 microns and diameters of from about 0.5 micron to about 20 microns, and the powder particles have diameters of from about 1 micron to about 100 microns.

5. The electrochemical cell of claim 3, where the support is from about 0.5 millimeter to about 2 millimeters thick and the oxide fibers in the support are selected from the group consisting of yttria stabilized zirconia fibers, calcia stabilized zirconia fibers, alumina fibers, mullite fibers, and mixtures thereof.

6. The electrochemical cell of claim 3, where the oxide fibers in the support are selected from the group consisting of yttria stabilized zirconia fibers, calcia stabilized zirconia fibers, and mixtures thereof, the fibers are sinterable to each other and to the zirconia particles in the support at sintering temperatures of up to 1700° C. and do not melt or form a structurally weak phase, and where the fibers in the support comprise from about 5 wt. % to about 20 wt. % of the support material.

7. The electrochemical cell of claim 3, where the support particles are comprised of calcia stabilized zirconia, the first electrode is comprised of doped and undoped oxides or mixtures of oxides, the electrolyte is cmprised of stabilized zirconia, and the second electrode is selected from the group consisting of nickel zirconia cermet and cobalt zirconia cermet.

8. A high temperature, solid electrolyte, tubular fuel cell comprising:
   (1) a porous, sintered, support tube comprising zirconia powder particles and from about 3 wt. % to about 45 wt. % of thermally stable oxide fibers, where the zirconia powder particles and the oxide fibers are sintered together in interlocking contact, said fibers being thermally stable up to about 1700° C.,
   (2) a separate first electrode disposed on the support,
   (3) a separate second electrode spaced away from the first electrode, and
   (4) a separate solid electrolyte disposed between the first electrode and the second electrode.

9. The fuel cell of claim 8, where the support particles are comprised of calcia stabilized zirconia, the first electrode is comprised of doped and undoped oxides for mixtures of oxides, the electrolyte is comprised of stabilized zirconia, the second electrode is selected from the group consisting of nickel zirconia cermet and cobalt zirconia cermet, and where the coefficient of thermal expansion of the fibers in the support approximates that of the zirconia powder particles in the support.

10. The fuel cell of claim 8, where the oxide film material in the support is not substantially reactive with the zirconia particle material at sintering temperatures of the support, and where the fibers in the support have lengths of from about 800 microns to about 2400 microns and diameters of from about 0.5 micron to about 20 microns, and the powder particles have diameters of from about 1 micron to about 100 microns.

11. The fuel cell of claim 8, where the support is from about 0.5 millimeter to about 2 millimeters thick, and the oxide fibers in the support are selected from the group consisting of yttria stabilized zirconia fibers, calcia stabilized zirconia fibers, alumina fibers, mullite fibers, and mixtures thereof.

12. The fuel cell of claim 8, where the oxide fibers in the support are selected from the group consisting of yttria stabilized zirconia fibers, calcia stabilized zirconia fibers, and mixtures thereof, the fibers are sinterable to each other and to the zirconia particles in the support at sintering temperatures of up to 1700° C. and do not melt or form a structurally weak phase, and where the fibers in the support comprise from about 5 wt. % to about 20 wt. % of the support material.

* * * * *